United States Patent
Ahn et al.

(10) Patent No.: US 9,574,887 B2
(45) Date of Patent: Feb. 21, 2017

(54) METHOD OF CALCULATING ROUTE, AND METHOD OR DEVICE FOR OBTAINING ROUTE

(71) Applicant: LG ELECTRONICS INC., Seoul (KR)

(72) Inventors: Hongbeom Ahn, Anyang-si (KR); Jaehyuk Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/649,156

(22) PCT Filed: Dec. 13, 2013

(86) PCT No.: PCT/KR2013/011592
§ 371 (c)(1),
(2) Date: Jun. 2, 2015

(87) PCT Pub. No.: WO2014/092504
PCT Pub. Date: Jun. 19, 2014

(65) Prior Publication Data
US 2016/0216125 A1 Jul. 28, 2016

Related U.S. Application Data

(60) Provisional application No. 61/905,262, filed on Nov. 17, 2013, provisional application No. 61/902,798, (Continued)

(51) Int. Cl.
*G01C 21/34* (2006.01)
*G06Q 50/30* (2012.01)
(Continued)

(52) U.S. Cl.
CPC ....... *G01C 21/3415* (2013.01); *G01C 21/3492* (2013.01); *G06Q 10/047* (2013.01);
(Continued)

(58) Field of Classification Search
None
See application file for complete search history.

(56) References Cited

U.S. PATENT DOCUMENTS 8,825,377 B2 * 9/2014 Callaghan .......... G01C 21/3438
701/416
9,222,793 B2 * 12/2015 Shin ................ G08G 1/096816
(Continued)

FOREIGN PATENT DOCUMENTS

CN 1751227 A 3/2006
CN 101043702 A 9/2007
(Continued)

*Primary Examiner* — Redhwan K Mawari
*Assistant Examiner* — Edward Torchinsky
(74) *Attorney, Agent, or Firm* — Birch, Stewart, Kolasch & Birch, LLP

(57) ABSTRACT

A method of determining whether there is a need to re-calculate a trip route including a departure point and a destination by using traffic information according to an embodiment of the present invention is provided. The method is performed by a server and includes: receiving the current position from a terminal when the terminal moves a specific distance from a previously reported position; obtaining the current position of a third party when the destination is the position of the third party defined as the identifier (ID) of the third party; and determining whether there is a need to re-calculate the route according to a specific condition based on the obtained current position of the third party, wherein the specific condition is (1) when the third party moves a distance equal to or greater than a predetermined value from the previously reported position or (2) when the third party moves a distance equal to or greater than a predefined value from the previously reported position and the distance between the current position of the terminal and the current position of the third party is shorter than a critical
(Continued)

value, and if one of the specific conditions is satisfied, it may be determined that there is a need to re-calculate the route.

16 Claims, 8 Drawing Sheets

Related U.S. Application Data filed on Nov. 12, 2013, provisional application No. 61/737,074, filed on Dec. 13, 2012.

(51) Int. Cl.
  *G08G 1/0968* (2006.01)
  *G06Q 10/04* (2012.01)
(52) U.S. Cl.
  CPC ....... *G06Q 50/30* (2013.01); *G08G 1/096811* (2013.01); *G08G 1/096844* (2013.01)

(56) References Cited

U.S. PATENT DOCUMENTS

| | | | |
|---|---|---|---|
| 2004/0160359 A1 | 8/2004 | Kanerva | |
| 2005/0222764 A1* | 10/2005 | Uyeki | G01C 21/3415 701/414 |
| 2007/0100539 A1 | 5/2007 | Jang et al. | |
| 2010/0156715 A1 | 6/2010 | Kang et al. | |
| 2010/0312476 A1* | 12/2010 | Mueller | G01C 21/362 701/302 |
| 2012/0143496 A1* | 6/2012 | Chitre | G01C 21/362 701/428 |
| 2012/0239584 A1 | 9/2012 | Yariv et al. | |
| 2014/0005941 A1* | 1/2014 | Paek | G01C 21/3438 701/533 |
| 2014/0343845 A1* | 11/2014 | Choi | G01C 21/3438 701/522 |

FOREIGN PATENT DOCUMENTS

| | | |
|---|---|---|
| EP | 2019290 A2 | 1/2009 |
| JP | 2003-262528 A | 9/2003 |
| JP | 2007-155744 A | 6/2007 |
| KR | 10-2005-0033900 A | 4/2005 |
| KR | 10-2005-0056699 A | 6/2005 |
| KR | 10-0541524 B1 | 1/2006 |
| KR | 10-2010-0064937 A | 6/2010 |
| KR | 10-2010-0068606 A | 6/2010 |
| KR | 10-2010-0071676 A | 6/2010 |
| KR | 10-2010-0118201 A | 11/2010 |
| KR | 10-1190746 B1 | 10/2012 |
| WO | WO 2014/063096 A1 | 4/2014 |

* cited by examiner

METHOD OF CALCULATING ROUTE, AND METHOD OR DEVICE FOR OBTAINING ROUTE

CROSS REFERENCE TO RELATED APPLICATIONS

This application is the National Phase of PCT International Application No. PCT/KR2013/011592, filed on Dec. 13, 2013, which claims priority under 35 U.S.C. 119(e) to U.S. Provisional Application No. 61/737,074, filed on Dec. 13, 2012, 61/902,798 filed on Nov. 12, 2013, and 61/905,262 filed on Nov. 17, 2013, all of which are hereby expressly incorporated by reference into the present application.

TECHNICAL FIELD

The present invention relates to a method of calculating a route and a method and device for obtaining a route and, more particularly, to a method or terminal for calculating a route using information provided by a server and a method or server for determining whether the information is provided or not.

BACKGROUND ART

Conventionally, a navigation terminal detects its current location, that is, an origin of a trip through a Global Positioning System (GPS) connection, receives information about a destination of the trip from a user, and internally calculates a route based on the origin and the destination. Along with the recent proliferation and increased performance of smartphones, services have become popular, in which a traffic and route information providing server provides route information, real-time traffic information related to routes, and other various information to Personal Navigation Devices (PNDs) over a mobile communication network.

Particularly in the situation where various navigation services are available, the Open Mobile Alliance (OMA) standardization organization is working on standardization of Dynamic Navigation Enabler (DynNav) that provides real-time traffic information by Peer to Peer (P2P) communication through an Internet Protocol (IP)-based network of a mobile communication network or a wireless network, rather than Traffic Protocol Expert Group (TPEG) information is transmitted over a Digital Multimedia Broadcasting (DMB) network that provides information in a broadcast signal. The standard considers a navigation terminal and a service type largely in two ways for a smartphone.

First, a traffic and route information providing server performs complex route computation, instead of a navigation application loaded in a smartphone, and indicates a calculated route to the smartphone. Second, owing to the improved performance of a smartphone, an application loaded in the smartphone performs or a navigation terminal equipped with a mobile communication modem performs route computation. In this case, the traffic and route information providing server does not provide route information. Rather, once the terminal registers a calculated route to the server, the terminal can receive from the server only real-time traffic information related to the registered route in a customized manner by IP-based P2P communication, not in a conventional broadcast signal.

FIG. 1 illustrates Navigation Device (ND) types. NDs may be classified into a type 110 that additionally provides TPEG-based traffic information transmitted through a broadcasting network such as a DMB network, a type 120 that additionally provides traffic information in an IP-based manner, for example, over a mobile communication network or a Wireless Fidelity (Wi-Fi) network, and a standalone type 130 that tracks the location of a vehicle through a GPS connection without connecting to other communication media, generates route information, and provides the route information.

DynNav under standardization in the OMA LOC WG belongs to the type 120 that provides IP-based traffic information, specifically by P2P communication. The following two types of NDs are defined in DynNav.

1. Smart ND: a device that can calculate a route on its own and thus requests only real-time traffic information to a DynNav server without receiving route information from the DynNav server.

2. Lightweight ND: a device that cannot calculate a route on its own and thus requests all real-time traffic information including route information to a DynNav server.

Since traffic information is requested and provided in a RESTful-based manner in a conventional DynNav system, the following route information formats are used and each information format can be defined by XML Schema Definition (XSD).

1) Trip Structure: a terminal initially acquires basic information such as an origin and a destination from a user, for route setting, and provides the acquired information to a server. The trip structure includes subsets corresponding to a plurality of route structures.

TABLE 1

| Element | Type | Optional | Description |
| --- | --- | --- | --- |
| originWGS84 | Location_Point | Yes | Location information about an origin represented by WGS84 (Location_Point structure is defined in tpeg-locML [TTI LOC]. At least one element originWGS84 or originAddress MUST be specified.) |
| originAddress | Civic Location Format | Yes | Location information about the origin represented as a civic location (Civic Location Format is defined by IETF [RFC 5139]. At least one element originWGS84 or originAddress MUST be specified.) |
| destinationWGS84 | Location_Point | Yes | Location information about a destination represented by WGS84 (Location Point structure is defined in tpeg-locML [TTI LOC]. At least one element destinationWGS84 or destinationAddress MUST be specified.) |
| destinationAddress | Civic Address Format | Yes | Location information about the destination represented as a civic location (Civic Location Format is defined by IETF [RFC 5139]. At |

TABLE 1-continued

| Element | Type | Optional | Description |
|---|---|---|---|
| | | | least one element destinationWGS84 or destinationAddress MUST be specified.) |
| waypoints | Location_Point [0 . . . unbounded] | Yes | Location information about a way point (represented by WGS84)(Location_Point structure is defined in tpeg-locML [TTI LOC].) |
| startingTime | xsd:dateTime | Yes | Starting time of navigation service (if a service starting time is specified, the trip is a planned trip. If a service starting time is not specified, a current time is the service starting time). (starting time of the planned trip. If not present, current time is assumed.) |
| tollRoad | xsd:boolean | Yes | It indicates whether passing through a toll road is allowed. (If true or not present, a toll road is allowed.) |
| vehicleType | Vehicle_Info | Yes | Information about a used vehicle (Vehicle_Info structure is defined in tpeg-rtmML [TTI RTM].) |
| calculateRoute | xsd:boolean | Yes | It indicates whether the server provides a calculated route. (If false or not present, the server should not propose routes.) |
| link | common:Link [0 . . . unbounded] | Yes | Lin information about routes defined in the trip. (Links to routes related to the trip. Attribute "rel" must be set to "Route".) |
| resourceURL | xsd:anyURI | Yes | Self-referring URL information (Self-referring URL. SHALL NOT be included in POST requests, MUST be included in responses to any HTTP method that returns an entity body, and in PUT requests.) |

2) Route Structure: a route structure is expressed as a plurality of segments as a way to represent total routes calculated using the trip structure.

TABLE 2

| Element | Type | Optional | Description |
|---|---|---|---|
| travellingTime | xsd:float | Yes | Total travelling time (in minutes) for the route |
| distance | xsd:float | Yes | Total distance (in Km) of the route |
| origin | Location_Point | No | Origin of the route (represented by WGS84) (Location_Point structure is defined in tpeg-locML [TTI LOC].) |
| segment | Segment [1 . . . unbounded] | No | Sequence of road segments that form the route |
| trafficEvents | CategorizedEvent ListReference [0 . . . unbounded] | Yes | Information about links accessing traffic information resources (List of traffic events as defined in tpeg-rtmML [TTI RTM], grouped into categories.) |
| link | common:Link | Yes | Reference to the route for which it is proposed as alternative. Attribute "rel" must be set to "Route". |
| resourceURL | xsd:anyURI | Yes | Self-referring URL. SHALL NOT be included in POST requests, MUST be included in responses to any HTTP method that returns an entity body, and in PUT requests.) |

3) Segment Structure: it is a structure that represents each segment. The segment structure may define a real-time traffic state corresponding to the segment as well as the length of the segment, in TPEG.

TABLE 3

| Element | Type | Optional | Description |
|---|---|---|---|
| endPoint | Location_Point | No | Location information about the end point of each segment (represented by WGS84)(Location_Point structure as defined in tpeg-locML [ITT LOC]. The starting point of the segment should be assumed equal to the ending point of the previous segment (or the trip origin for the first segment)) |
| midwayPoint | Location_Point [0 . . . unbounded] | Yes | Location_Point structure as defined in tpeg-locML [TTI LOC]. |

TABLE 3-continued

| Element | Type | Optional | Description |
|---|---|---|---|
| linkName | xsd:string | Yes | Name of the road that the segment belongs to |
| distance | xsd:float | Yes | Length of the segment in km |
| travellingTime | xsd:float | Yes | Estimated average time to cover the segment expressed in minutes. It includes regular travelling time and delay. |
| delay | xsd:float | Yes | Estimated delay along the segment expressed in minutes. |
| speed | xsd:float | Yes | Estimated average speed along the segment expressed in m/s. |
| performance | xsd:string | Yes | Information about traffic state (levels may be defined to indicate delay, congestion, and severe congestion). (Description of traffic conditions along the segment. This field should be encoded according to tpeg rtmML definition [TTI RTM].) |

FIG. 2 is a diagram illustrating a signal flow for an operation of a lightweight ND in a conventional DynNav system. Because the lightweight ND does not support route calculation in view of its capability, the lightweight ND should request route information to a server and receive the route information from the server. The lightweight ND has the following main functionality.

1. The smart ND transmits trip information to the server, for use in route calculation at the server.

2. The smart ND receives information about a set of routes (including a recommended route) calculated by the server from the server.

3. The smart ND subscribes to a notification service to receive real-time traffic information from the server.

The signal flow illustrated in FIG. 2 contains the followings, on the whole.

1. The user defines journey parameters, and the application sends the parameters to the server; the server calculates a set of proposed routes based on the received parameters with related traffic information. The server replies with the location of the created "trip" resource to the application.

a) The server may reply with a representation of the created "trip" resource. In this use case, behaviors are equivalent.

2. The application uploads the calculated route to resource/{tripId}/routes. The server may replay with a representation of a "route" resource containing performance parameters and links to traffic events.

a) The server may reply with traffic information (performance parameters and traffic events). In this case, additional GET operation is necessary to retrieve the resource.

3. The application subscribes to a notification service for a trip and route.

4. The traffic events and/or performance parameters are modified for the subscribed route(s); Notification resource is created.

5. The server delivers the notification resource to the application using links to the modified resources with the trip and route containing the updated performance parameters and traffic information.

6. The application accesses the updated resources and reads the resources.

7. The application decides to calculate a new route using the received resources.

8. The application uploads the newly calculated route to resource/{tripId}/routes. The server replies with a representation of the "route" resource containing route performances and links to events. This step may be repeated several times until a route satisfying performance restriction is found.

9. The application requests to modify subscription setting for adding notification of the newly subscribed route.

FIG. 3 shows operation of a smart ND described with reference to FIG. 2 when a destination is a third terminal (that is, a target terminal 34).

For fast GPS connection and additional support information delivery between a navigation terminal (that is, a source terminal 31) and a location server 33 before performing a navigation service, positioning assistance data (A/D) is shared between the source terminal and the location server using a location information delivery protocol.

S301: The source terminal 31 performs a service for setting the location of the target terminal 34 as a destination. In this step, an identifier (ID) for identifying the target terminal is used to specify the target terminal. Here, a globally unique value of a terminal, such as Ipv4 address, Ipv6 address, MSISDN, IMSI, etc., is used as the identifier.

S302: The source terminal delivers the identifier of the specified target terminal and notifies a traffic information server 32 that the service for setting the location of the target terminal as the destination is performed. In this step, for the service, the source terminal delivers the location information thereof to the traffic information server.

S303: The traffic information server requests permission to use the location information of the target terminal and to perform the service from the target terminal and receives a response for accepting the request. In this step, if the target terminal does not accept the request, the service is not performed.

S304: If the target terminal accepts performance of the service in S303, the navigation service starts.

S305: The traffic information server requests the location information of the target terminal via the location server 33 as soon as the navigation service starts.

S306: The location server acquires the location information of the target terminal according to the request of the traffic information server.

S307: The location server transmits the location of the target terminal acquired in S306 to the traffic information server.

S308: The traffic information server delivers the location information of the target terminal acquired in S307 to the source terminal. At the same time, partial traffic information may be provided. The partial traffic information includes detailed traffic information (performance parameters) of the vicinity (within a certain radius) of a departure point and traffic event information (traffic event) from the departure point to the destination based on the location of the source terminal delivered by the source terminal in S302 and the location of the target terminal delivered by the location server in S307.

S309: The source terminal calculates an optimal route based on the location of the target terminal and the partial traffic information received in S308.

S310: The source terminal registers the route acquired in S309 with the traffic information server. The route is registered with the traffic information server in order to receive, from the traffic information server, traffic condition change (that is, traffic information=detailed traffic information+ traffic event information) of the route based on the registered route in addition to a current traffic condition based on the registered route.

S311: The traffic information server delivers the current traffic condition of the registered route information to the source terminal, in order to calculate an estimated time of arrival of the source terminal on the route. Since information on traffic accidents or construction on the route is delivered in S308, re-calculation of the route is not performed.

S312: The location server may track the location of the target terminal on a predetermined cycle (temporal cycle) and deliver the location information to the traffic information server or continuously track the location of the target terminal and deliver the location information to the traffic information server only when a movement distance is satisfied.

S313: The traffic information server delivers the received location of the target terminal to the source terminal.

S314: The source terminal re-calculates the route (or performs re-searching) based on the received location of the target terminal. After the route is re-calculated, the operation returns to S309 to repeat S309 to S314 repeated.

The smart ND of the conventional DynNav system described with reference to FIGS. 2 and 3 has several problems.

1) Problems Occurring when the Smart ND Operates on a Predetermined Cycle

If the location server receives and delivers the location information of the target terminal to the source terminal on a temporal cycle, for example, if it is assumed that the location server obtains the location of the target terminal at an interval of 5 min, assume that the location of the source/target terminal is hardly changed for 5 min. After 5 min has elapsed, when the source terminal acquires the location of the target terminal and re-calculates the route ting based on the acquired location, the re-calculated route may be hardly changed from the existing route. In this case, since the route is unnecessarily re-calculated, overhead occurs in data processing, transmission and reception.

2) Problems Occurring when the Source Terminal Decides Route Re-Calculation

The source terminal does not have traffic condition information and decides route re-calculation using the location thereof and the location of the target terminal. In such a decision process, an actual traffic condition may not be considered. That is, if the current location of the target terminal is not included in an existing route, since traffic condition information from the existing route to the current location of the target terminal is not present, a probability that the re-calculated route does not include an actual traffic condition is very high.

DISCLOSURE

Technical Problem

An object of the present invention devised to solve the problem lies in a method for solving problems occurring in a conventional service, that is, inefficiency and drawbacks of route re-calculation.

The technical problems solved by the present invention are not limited to the above technical problems and other technical problems which are not described herein will become apparent to those skilled in the art from the following description.

Technical Solution

The object of the present invention can be achieved by providing a method of, at a server, determining whether re-calculation of a trip route identified by a departure point and a destination is required using traffic information including receiving a current location of a terminal from the terminal when the terminal moves from a previously reported location by a specific distance, acquiring a current location of a third party when the destination is a location of the third party defined by an identifier (ID) of the third party, and determining whether re-calculation of the route is required according to specific conditions based on the acquired current location of the third party, wherein the specific conditions include (1) the third party moves from a previously reported location by a predetermined distance or more, or (2) the third party does not move from the previously reported location by the predetermined distance or more and a distance between the current location of the terminal and the current location of the third party is less than a threshold value, and wherein, if one of the specific conditions is satisfied, a determination is made that re-calculation of the route is required.

Preferably, the method may further include, if the determination is made that re-calculation of the route is required, transmitting the acquired current location of the third party and updated traffic information of an ongoing route to the terminal.

Preferably, the terminal may be configured to re-calculate the route based on the acquired current location of the third party and the updated traffic information of the ongoing route.

Preferably, the method may further include, if the current location of the terminal is received from the terminal, requesting location information of the third party to a location server, and receiving the location information of the third party from the location server in response to the request.

Preferably, the method may further include, if the determination is made that re-calculation of the route is not required, waiting until the terminal moves from the current location of the terminal by the specific distance.

In another aspect of the present invention, provided herein is a method of, at a terminal, determining whether re-calculation of a trip route identified by a departure point and a destination is required using traffic information including transmitting a current location of the terminal to a server when the terminal moves from a previously reported location by a specific distance, and receiving a current location of a third party and updated traffic information of an ongoing route from the server, when the destination is a location of the third party defined by an identifier (ID) of the third party and a determination is made that re-calculation of the route is required according to specific conditions based on the current location of the third party, wherein the specific conditions include (1) the third party moves from a previously reported location by a predetermined distance or more, or (2) the third party does not move from the previously reported location by the predetermined distance or more and a distance between the current location of the terminal and the current location of the third party is less than a threshold value, and wherein, if any one of the specific conditions is satisfied, a determination is made that re-calculation of the route is required.

Preferably, the method may further include re-calculating the route based on the received current location of the third party and the updated traffic information of the ongoing route.

The method may further include waiting until the terminal moves from the current location by the specific location, if the determination is made that re-calculation of the route is not required.

In another aspect of the present invention, provided herein is a server configured to determine whether re-calculation of a trip route identified by a departure point and a destination is required using traffic information including a transceiver configured to communicate with a terminal, and a processor configured to provide traffic information of a route received from the terminal, wherein the processor is configured to receive a current location of the terminal from the terminal when the terminal moves from a previously reported location by a specific distance, acquire a current location of a third party when the destination is a location of the third party defined by an identifier (ID) of the third party, and determine whether re-calculation of the route is required according to specific conditions based on the acquired current location of the third party, wherein the specific conditions include (1) the third party moves from a previously reported location by a predetermined distance or more, or (2) the third party does not move from the previously reported location by the predetermined distance or more and a distance between the current location of the terminal and the current location of the third party is less than a threshold value, and wherein, if any one of the specific conditions is satisfied, a determination is made that re-routing is required.

Preferably, if the determination is made that re-calculation of the route is required, the processor may be configured to transmit the acquired current location of the third party and updated traffic information of an ongoing route to the terminal.

Preferably, the terminal may be configured to re-calculate the route based on the acquired current location of the third party and the updated traffic information of the ongoing route.

Preferably, if the current location of the terminal is received from the terminal, the processor may be configured to request location information of the third party from a location server and to receive the location information of the third party from the location server in response to the request.

Preferably, if the determination is made that re-calculation of the route is not required, the processor is configured to wait until the terminal moves from the current location of the terminal by the specific distance.

In another aspect of the present invention, provided herein is a terminal configured to determine whether re-calculation of a trip route identified by a departure point and a destination is required using traffic information including a transceiver configured to communicate with a server, and a processor configured to calculate a route based on traffic information of a route received from the server and/or a location of a destination, wherein the processor is configured to transmit a current location of the terminal to the server when the terminal moves from a previously reported location by a specific distance, and receive a current location of a third party and updated traffic information of an ongoing route from the server, when the destination is a location of the third party defined by an identifier (ID) of the third party and a determination is made that re-calculation of the route is required according to specific conditions based on a current location of the third party, wherein the specific conditions include (1) the third party moves from a previously reported location by a predetermined distance or more, or (2) the third party does not move from the previously reported location by the predetermined distance or more and a distance between the current location of the terminal and the current location of the third party is less than a threshold value, and wherein, if one of the specific conditions is satisfied, a determination is made that re-calculation of the route is required.

Preferably, the processor may be configured to re-calculate the route based on the received current location of the third party and the updated traffic information of the ongoing route.

Preferably, the processor may be configured to wait until the terminal moves from the current location by the specific location, if the determination is made that re-calculation of the route is not required.

It is to be understood that both the foregoing general description and the following detailed description are merely exemplary of the invention, and are intended to provide an overview or framework for understanding the nature and character of the invention as claimed.

Advantageous Effects

According to embodiments of the present invention, it is possible to reduce unnecessary data transmission and delivery which may occur between a navigation device (or an application program) and a server and to improve service quality and/or quality of experience (QoE) of a user.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
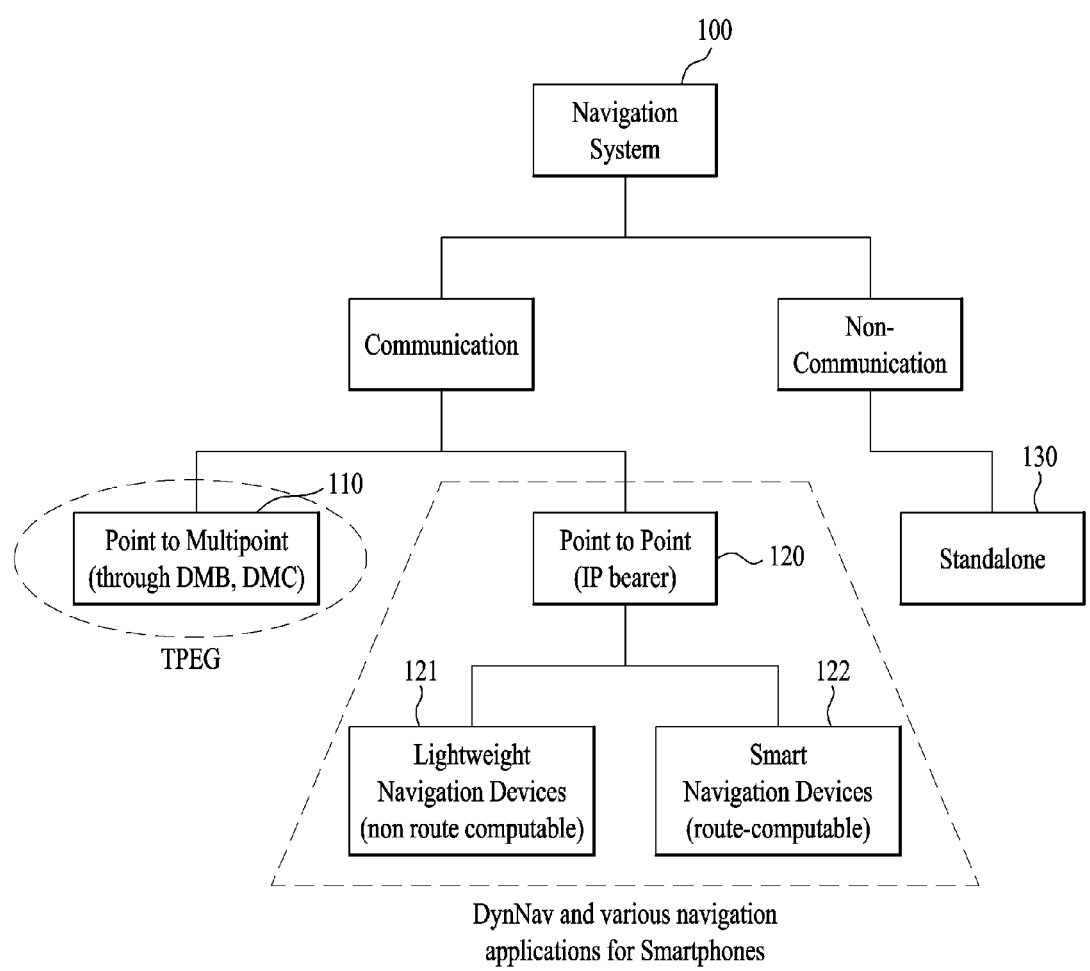
FIG. 1 is a diagram showing classification of a navigation device.
Figure 2:
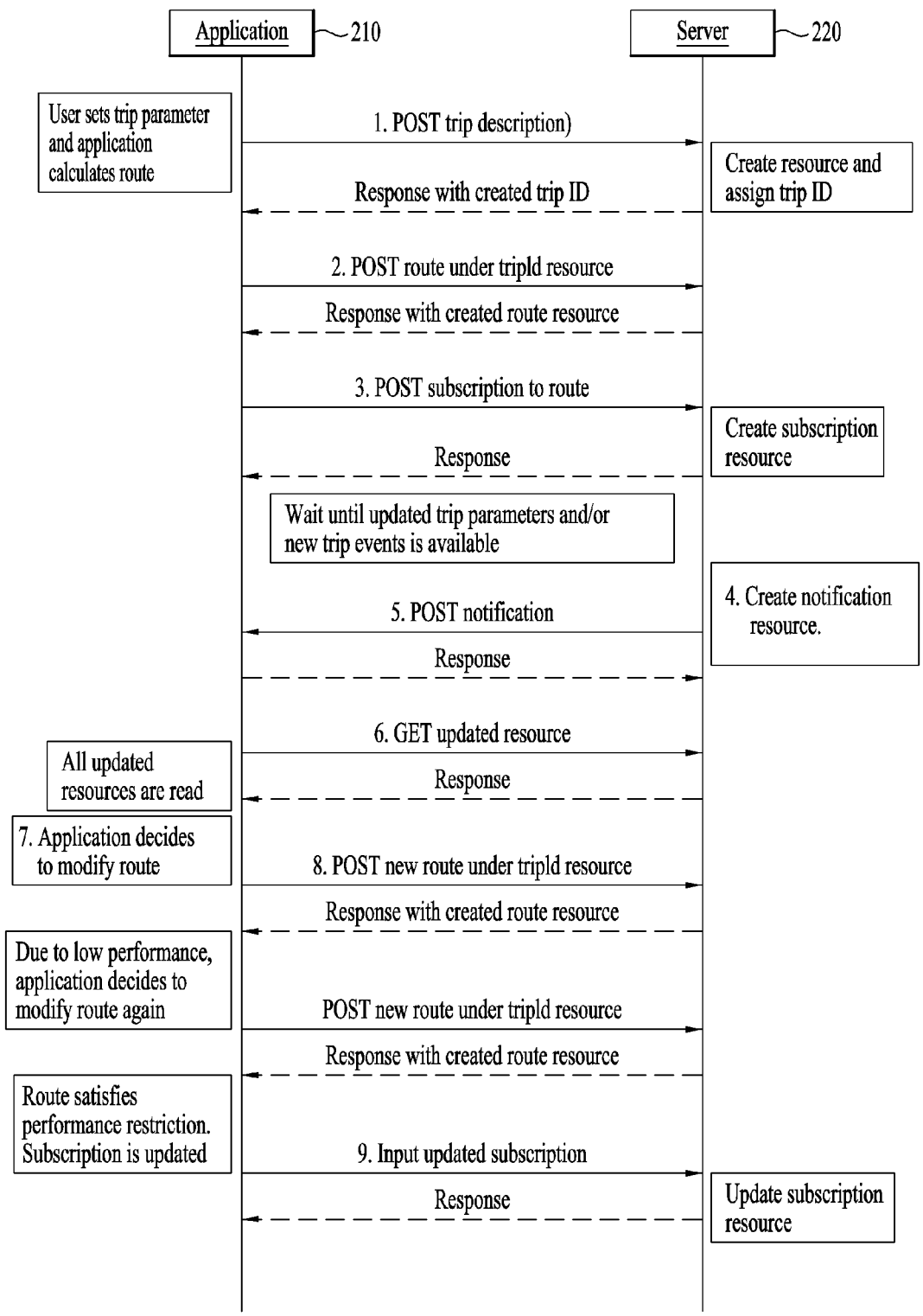
FIG. 2 is a flowchart showing operation of a smart ND in a conventional DynNav system.
Figure 3:
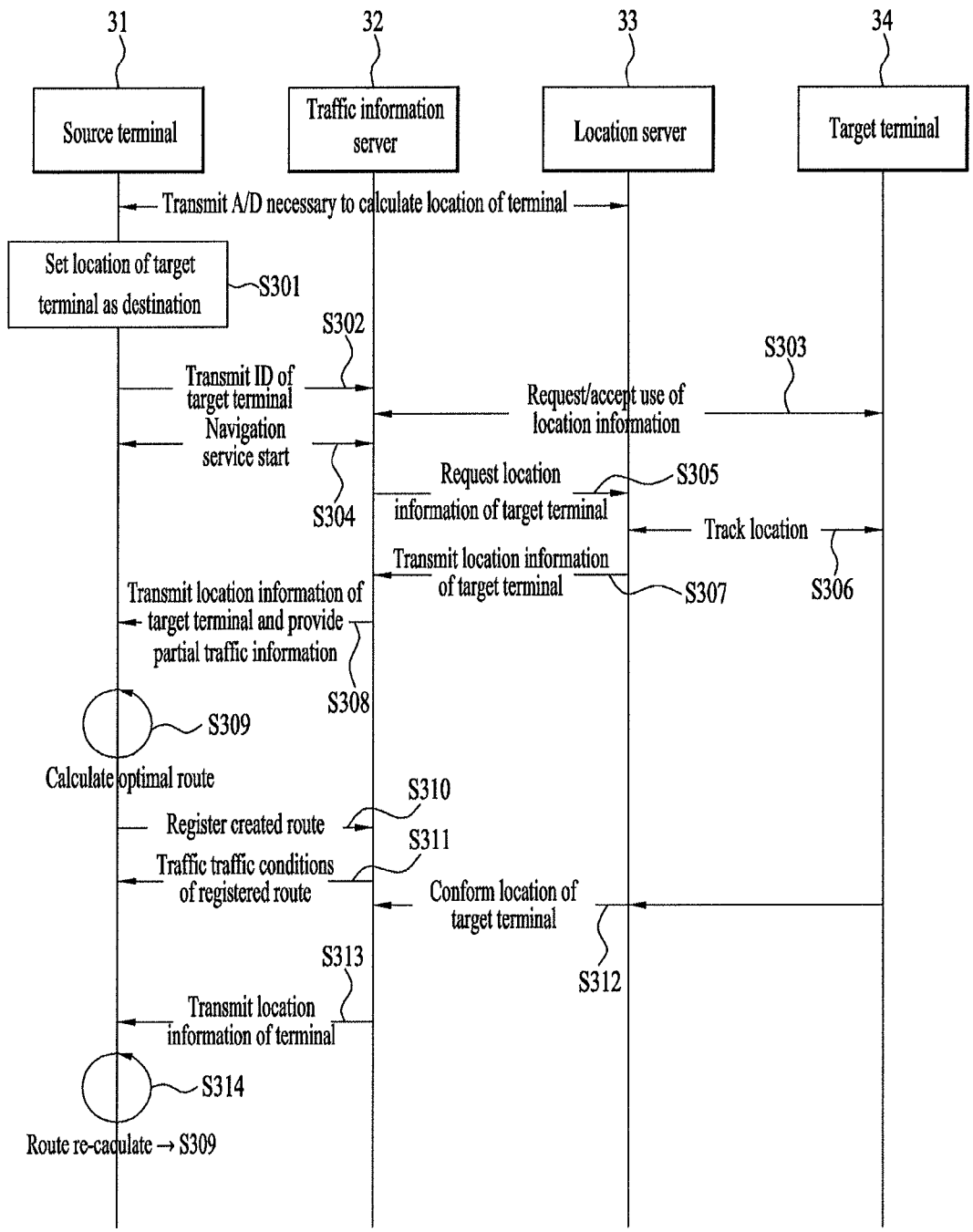
FIG. 3 is a flowchart showing operation of a smart ND when a destination of a route is a movable terminal (that is, a target terminal).

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Terms used herein will be defined as follows.

Application

An application is an implementation of a well-defined but not standardized set of functions that perform work on behalf of a user. The application may include software and/or hardware elements and associated user interfaces.

Server

In general, a server is an entity that provides resources to clients in response to requests in the technical field of the present invention.

Client

In general, a client is a device, user agent, or other entity that acts as a receiver of a service in the technical field of the present invention.

DynNav Application

A DynNav application is an entity that is in charge of interacting with a DynNav server to get optimal route(s), real-time and forecasted traffic information, and complementary data. Therefore, the DynNav application is loaded in a terminal such as a smartphone, a mobile phone, an ND, etc. Accordingly, the term DynNav application is interchangeably used with terminal. In this aspect, the DynNav application is a kind of client. In this description, the DynNav application is referred to as a source terminal or a target terminal, or a terminal. The source terminal is referred to a terminal requesting a target terminal location based-route setting service and the target terminal is referred to an entity corresponding to destination in the service.

DynNav Server

A DynNav is an entity that is in charge of providing optimal route(s), real-time and forecasted traffic information, and complementary data to the application. In this aspect, the DynNav server is a kind of server.

Location URI

A location Uniform Resource Identifier (URI) is a URI that enables the current location of a device to be obtained from a particular location server using a particular dereferencing protocol.

Navigation Device (ND)

An ND is an entity that assists a driver, showing a correct route using a Global Navigation Satellite System (GNSS) service to reach a final destination. This entity may process real-time and predicted traffic information and dynamically estimates the optimal route, according to user preferences.

Lightweight ND

A lightweight ND is a navigation device that does not have a route calculation function, requests a calculated route to a server, and receives information about the calculated route from the server. The lightweight ND accesses the server for route estimation functionalities and for retrieving roads shape representation, if not available in a local map database.

Smart ND

A smart ND is a navigation device that is able to calculate a route(s), using a road network database available on the device itself.

Point Of Interest (POI)

A POI describes information about locations such as name, category, unique identifier, or civic address.

Segment

A segment is a unit into which a road is divided. For a general road, a road running between intersections is a segment, whereas for a highway, a road is divided into segments according to a policy for the highway. Traffic congestion or a passing time may be determined on a segment basis. In the specification, the term segment is interchangeably used with a road section.

Segment Sequence

A set consisting of one or more consecutive segments. If necessary, the segment sequence consisting of one segment is available. Also, an end point of the first segment of the segment sequence consisting of two or more segments is equal to a start point of the second segment of the segment sequence.

Polyline

A polyline is a continuous line used in graphic computing composed of one or more line segments, defined by specifying the endpoints of each segment.

Route Information

Route information is information about segment end points and complementary data from a defined origin and a destination.

Traffic Information

Traffic information is information including traffic events and network performance parameters related to an area or a route. Further, the traffic information may include current or upcoming, that is, future traffic information.

Traffic Event

A traffic event is information about events related to an area or a route that are either imposed or planned by a road network operator (i.e., road works leading to lane closures) or events that occur outside the control of the road network operator (i.e., accidents).

Network Performance Parameter

A network performance parameter is information regarding the performance (i.e., speed, delay, and travel time) of road segments related to an area or a route).

Route Information in Full Format

Route information in a full format is a type of route information including information about all segments from a origin to a destination. Unless specified otherwise, route information is about a whole route.

Route Information in Summarized Format

Route information in a summarized format is a kind of route information including only information about segments selected for a summary of information from among all segments of a route between an origin and a destination (how segments are to be selected is beyond the scope of the present invention).

The present invention relates to a navigation system, method, and apparatus for reflecting real-time traffic information, and more particularly, to a navigation system, method, and apparatus for allowing a traffic information providing server to transmit real-time traffic information to an ND using a minimal communication bandwidth, when the ND is able to calculate a route on its own and has a modem connectable to a mobile communication network in a system for providing real-time traffic information. The present invention relates to a navigation system, method, and apparatus for allowing a traffic information providing server to transmit information about an optimal route and real-time traffic information to an ND even though the ND is not able to calculate a route on its own but is connectable to a mobile communication network. Along with the recent proliferation of smartphones, a navigation service of providing a travel route to a mobile communication terminal in a manner other than using a conventional Digital Multimedia Broadcasting (DMB) network is becoming popular. The OMA LOC WG calls this service Dynamic Navigation Enabler (DynNav).

In the specification, an ND refers to a device that can execute a route guidance function. The ND is any electronic device that can be carried, like a smartphone, a mobile phone, a mobile device, a laptop computer, a tablet PC, a smart pad, etc. or that can be attached to a portable object.

Figure 4:
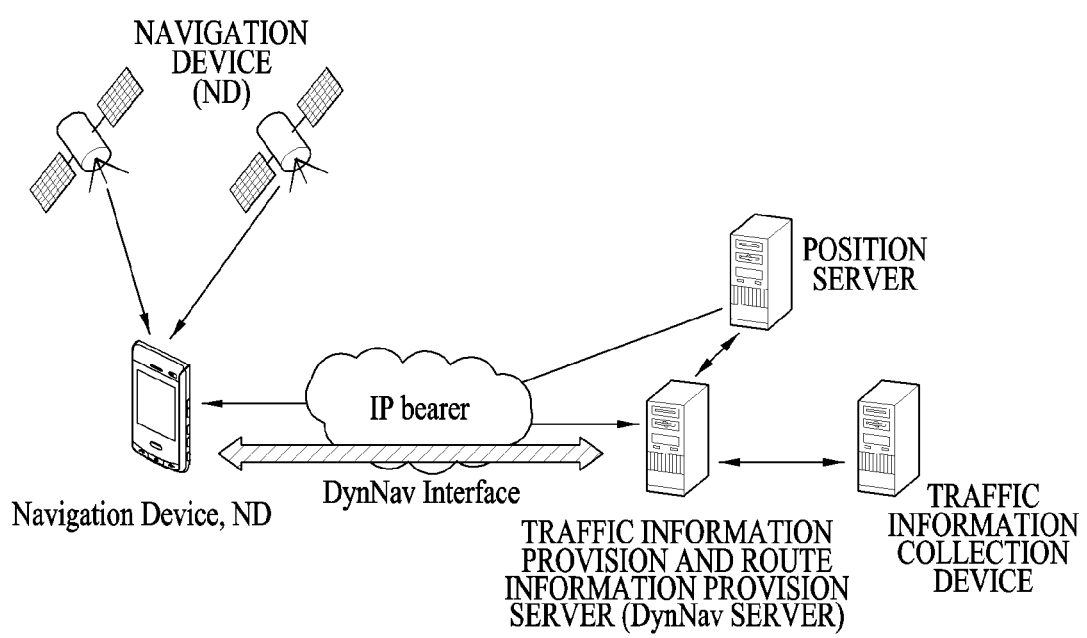
FIG. 4 is a diagram showing a network configuration illustrating an IP based DynNav system which is a navigation system of the present invention.

FIG. 4 illustrates a network configuration referred to for describing an Internet Protocol (IP)-based DynNav system being a navigation system according to the present invention. As illustrated in FIG. 4, the navigation system according to the present invention may include an ND that may be connected to a mobile communication network, a mobile communication network for wireless transmission and reception, a traffic information collector and a traffic information and route information providing server (i.e. a DynNav server), which provide traffic information, and a location server for generating and providing assistance data to locate an ND.

For simplicity of description, the traffic information and route information providing server or the DynNav server is referred to shortly as the "server". The navigation device is referred to shortly as the ND. According to the capability of an ND, the ND is referred to as the "smart ND" or "lightweight ND".

In the present invention, a terminal (two terminal types are available, as described before) may be connected to a mobile communication network or an IP network such as a Wireless Fidelity (Wi-Fi) network as illustrated in the figure. A corresponding application may access the server, receive route guidance data and real-time traffic information, and thus provide route guidance. While not shown, a terminal capable of calculating a route on its own may selectively receive only real-time traffic information without receiving route guidance data from the server.

The real-time traffic information refers to optimal route information calculated and transmitted to the terminal by the server, real-time and forecasted traffic information, and additional information related to traffic, such as POI and weather. To avoid representational redundancy, a navigation application or a terminal is collectively referred to as a terminal. Accordingly, the terms "terminal", "smart ND", "lightweight ND", and "navigation application" may be referred to uniformly as "terminal".

Figure 5:
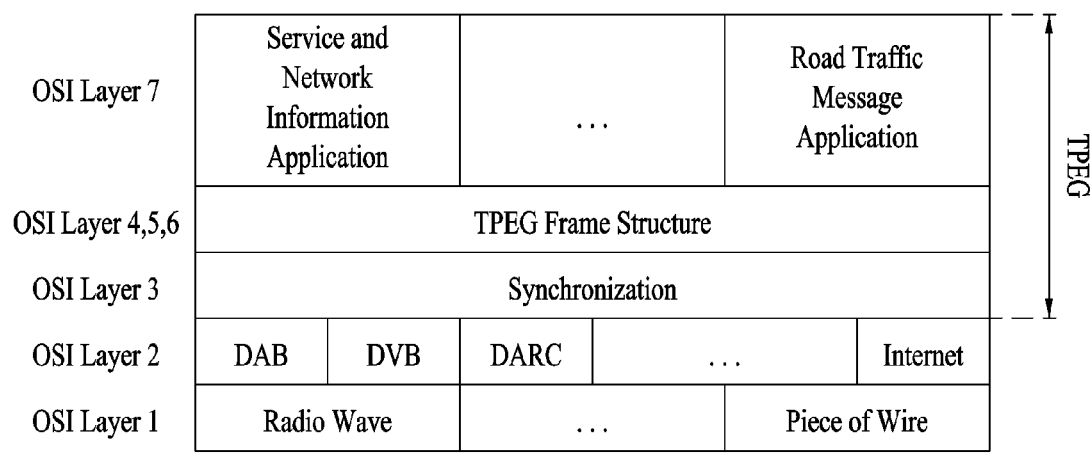
FIG. 5 is a diagram showing a hierarchical structure of a TPEG.

The afore-mentioned real-time traffic information may be represented in Transport Protocol Experts Group (TPEG) under consideration in the ISO standardization organization. TPEG is a standard protocol used to transmit traffic information and travel information over a digital broadcasting network. As illustrated in FIG. 5, a TPEG layer stack corresponds to the network layer (Layer 3; L3) to application layer (Layer 7; L7) of the ISO/OSI layer model. The network layer defines TPEG frame synchronization and routing. The packetization layer of Layers 4, 5, 6 (L4, L5, and L6) combines components of applications into one stream. Each message format corresponds to the application layer, L7. In DynNav, real-time traffic information may be provided to a terminal in a real-time traffic information representation scheme of TPEG or any other representation scheme.

Figure 6:
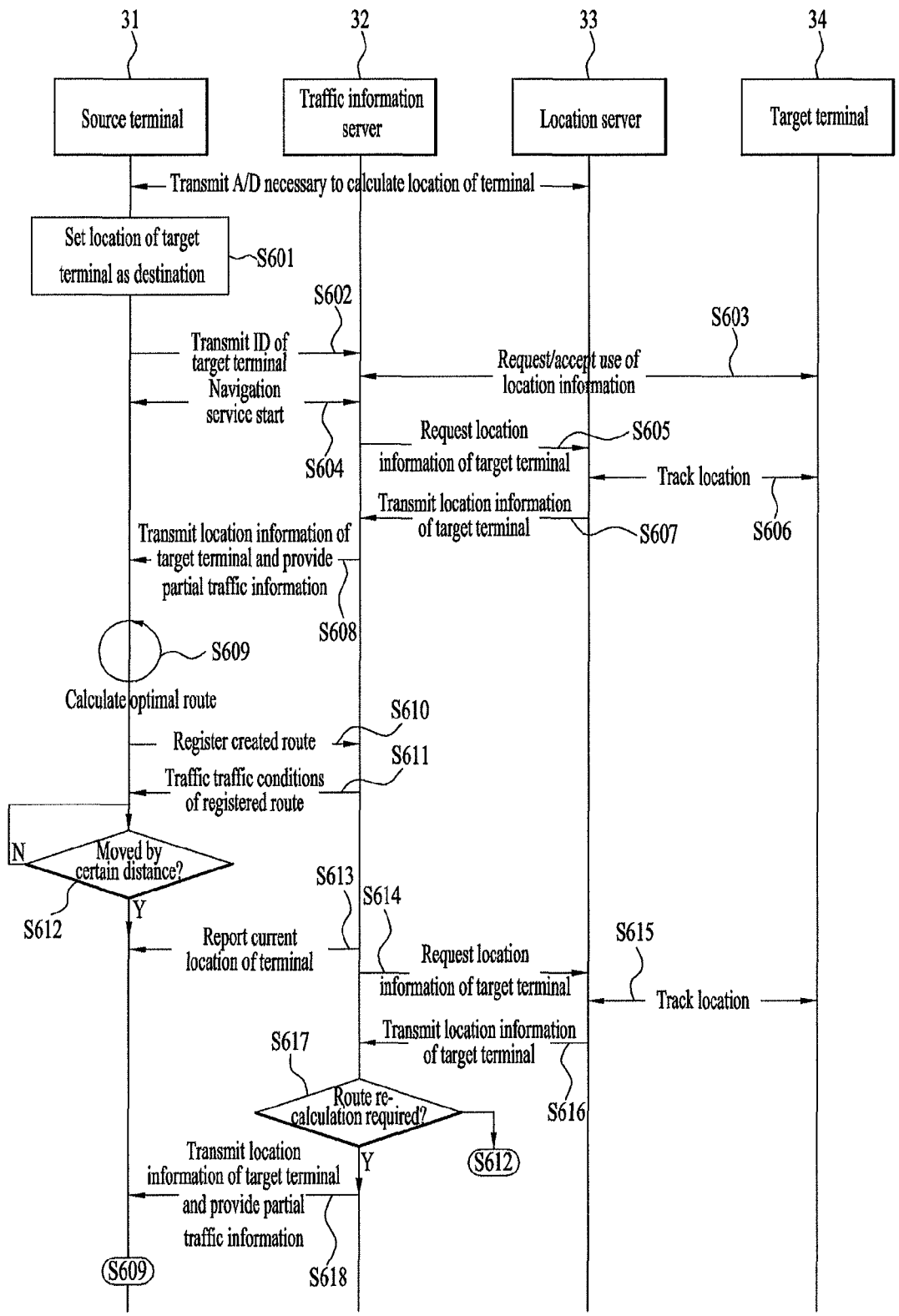
FIG. 6 is a flowchart of operation according to one embodiment of the present invention.

FIG. 6 is a flowchart of operation according to one embodiment of the present invention. A terminal of FIG. 6 is a smart ND. The smart ND may receive traffic information from a server before calculating a route. The terminal first acquires trip structure information such as an origin and a destination from a navigation user and transmits the trip structure information to the server to receive traffic information of a route before calculating the route. The flowchart of FIG. 6 will now be described in detail.

For fast GPS connection and additional support information delivery between a navigation terminal (that is, a source terminal 31) and a location server 33 before performing a navigation service, positioning assistance data (A/D) is shared between the source terminal and the location server using a location information delivery protocol.

The source terminal 31 may set the location of the target terminal as a destination of a route in order to perform a service for setting the location of the target terminal 34 as the destination (third party tracking) (S601). In this step, an identifier (ID) for identifying the target terminal is used to specify the target terminal. Here, a globally unique value of a terminal, such as IPv4 address, IPv6 address, MSISDN, IMSI, etc., is used as the identifier.

The source terminal may deliver the identifier of the specified target terminal and notify a traffic information server 32 that the service for setting the location of the target terminal as the destination is performed (S602). In this step, for the service, the source terminal delivers the location information thereof to the traffic information server.

The traffic information server may request permission to use the location information of the target terminal and to perform the service from the target terminal and receive a response for accepting the request (S603). If the target terminal does not accept the request, the service is not performed.

If the target terminal accepts the request in S603, the navigation service starts (S604).

The traffic information server may request the location information of the target terminal via the location server 33 as soon as the navigation service starts (S605).

The location server may acquire the location information of the target terminal according to the request of the traffic information server (S606). The location server may transmit the location of the target terminal acquired in S606 to the traffic information server (S607).

The traffic information server may deliver the location information of the target terminal acquired in S607 to the source terminal (S608). At the same time, the traffic information server may transmit partial traffic information to the source terminal. The partial traffic information includes detailed traffic information (performance parameters) of the vicinity (within a certain radius) of a departure point and traffic event information (traffic event) from the departure point to the destination based on the location of the source terminal delivered by the source terminal in S602 and the location of the target terminal delivered by the location server in S607.

The source terminal may calculate an optimal route based on the location of the target terminal and the partial traffic information received in S608 (S609). The source terminal registers the route acquired in S609 with the traffic information server (S610). The route is registered with the traffic information server in order to receive, from the traffic information server, traffic condition change of the route based on the registered route in addition to a current traffic condition based on the registered route.

The traffic information server may deliver the current traffic condition of the registered route information to the source terminal (S611), in order to calculate an estimated time of arrival of the source terminal on the route. Since information on traffic accidents or construction on the route is delivered in S608, the route is not re-calculated.

Whether the source terminal moves by a certain distance may be made after the navigation service has been performed (S612). Since the source terminal can detect movement of a vehicle in which the source terminal is mounted, the operation progresses to a next step if the vehicle moves by the certain distance and, otherwise, this step is repeated. That is, in one embodiment of the present invention, whenever the source terminal moves by the certain distance, this step and the following steps S613 to S618 are performed. In other words, S612 is a process of triggering the above-described steps.

The source terminal, which has moved by the certain distance, may provide the location thereof to the traffic information server (S613). The source terminal reports the location thereof for the following reasons.

1. The route, on which the vehicle has already passed, does not need to be managed. That is, when the source terminal reports the location thereof in S613, the size of the route managed by the traffic information server may be reduced to reduce the load of the server. In addition, as the size of the route is reduced, traffic condition information may also be reduced.

2. Since the source terminal has moved by the certain distance, it is necessary to check the location of the target terminal and to determine whether an additional route calculation process is required. In addition, the source terminal may move by the certain distance and the target terminal may move by another distance. That is, in one embodiment of the present invention, since the locations of the departure point and the destination may be dynamically changed, it is necessary to periodically report or acquire the location of the source terminal or the location of the target terminal.

In this case, the following operation according to movement of the target terminal instead of movement of the source terminal may be considered. However, since a subject which receives a navigation service is the source terminal, the target terminal may not move with elapse of time and, when the source terminal hardly moves, the route from the unchanged location of the source terminal to the previously reported location of the target terminal is valid, the following operation of one embodiment of the present invention is preferably triggered based on movement of the source terminal.

When the current location of the source terminal is received in S613, the traffic information server may request the current location information of the target terminal via the location server (S614), in order to obtain information to be used to determine whether re-calculation (re-search) of the route is necessary, that is, to obtain the current location of the target terminal. As described below, whether re-calculation of the route is required may be determined according to the current location of the target terminal. This step may be performed when the source terminal has moved by the certain distance in S612. Since the movement of the source terminal has been already checked in S612, this step is performed in order to obtain the current location of the target terminal necessary to calculate the route (as the location of the destination).

The location server may acquire the current location information of the target terminal according to the request of the traffic information server (S615). The location server may transmit the location of the target terminal acquired in S615 to the traffic information server (S616).

The traffic information server may determine whether re-calculation of the route is required based on the current location of the source terminal acquired in S613 and the current location of the target terminal acquired in S616 (S617).

Although the actual route re-calculation operation is performed by the source terminal (as described above, the source terminal is a smart ND and thus searches for/calculates the route), the traffic information server also determines whether re-calculation of the route is required for the following reasons.

The source terminal has route search/calculation capabilities but cannot check the traffic conditions of the route. In one embodiment of the present invention, since the traffic information server checks information on the traffic conditions, the traffic information server may provide traffic information necessary for fast additional route information acquisition of the source terminal when delivering the location of the target terminal based on 1) the location of the target terminal and 2) the performed navigation service.

More specifically, in S617, whether re-calculation of the route is required is determined based on the following conditions:

Condition 1: the target terminal moves from the previously reported location by a certain distance or more Condition 2: the distance between the source terminal and the target terminal is less than the certain distance Conditions 1 and 2 may be summarized as follows.

Re-calculation of the route (re-routing) is required under the following specific conditions: (1) the third party (that is, the target terminal) moves from the previously reported location of the third party by a certain distance or more, or (2) the target terminal does not move from the previously reported location by the certain distance but the distance between the source terminal and the target terminal is closer than a threshold value.

Additionally,

Condition 3: the traffic condition is significantly changed on the route between the source terminal and the target terminal The above-described three conditions are included.

If the traffic information server determines that re-routing of the source terminal is required in S617, the traffic information server may deliver the current location information of the target terminal and information on the updated traffic conditions of the current route (that is, previous route) to the source terminal (S618). Once these steps are all performed, the operation returns to S619 to repeat the service process until the source terminal reaches the location of the target terminal.

The information on the traffic condition includes necessary detailed traffic information (performance parameters) from the source terminal to the target terminal or non-detailed traffic information (traffic events). The included conditions are not separately designated but may be set by the traffic information server as necessary.

If the traffic information server determines that re-routing of the source terminal is not required in S617, the embodiment of the present invention returns to S612 and waits until the source terminal moves by the certain distance.

Figure 7:
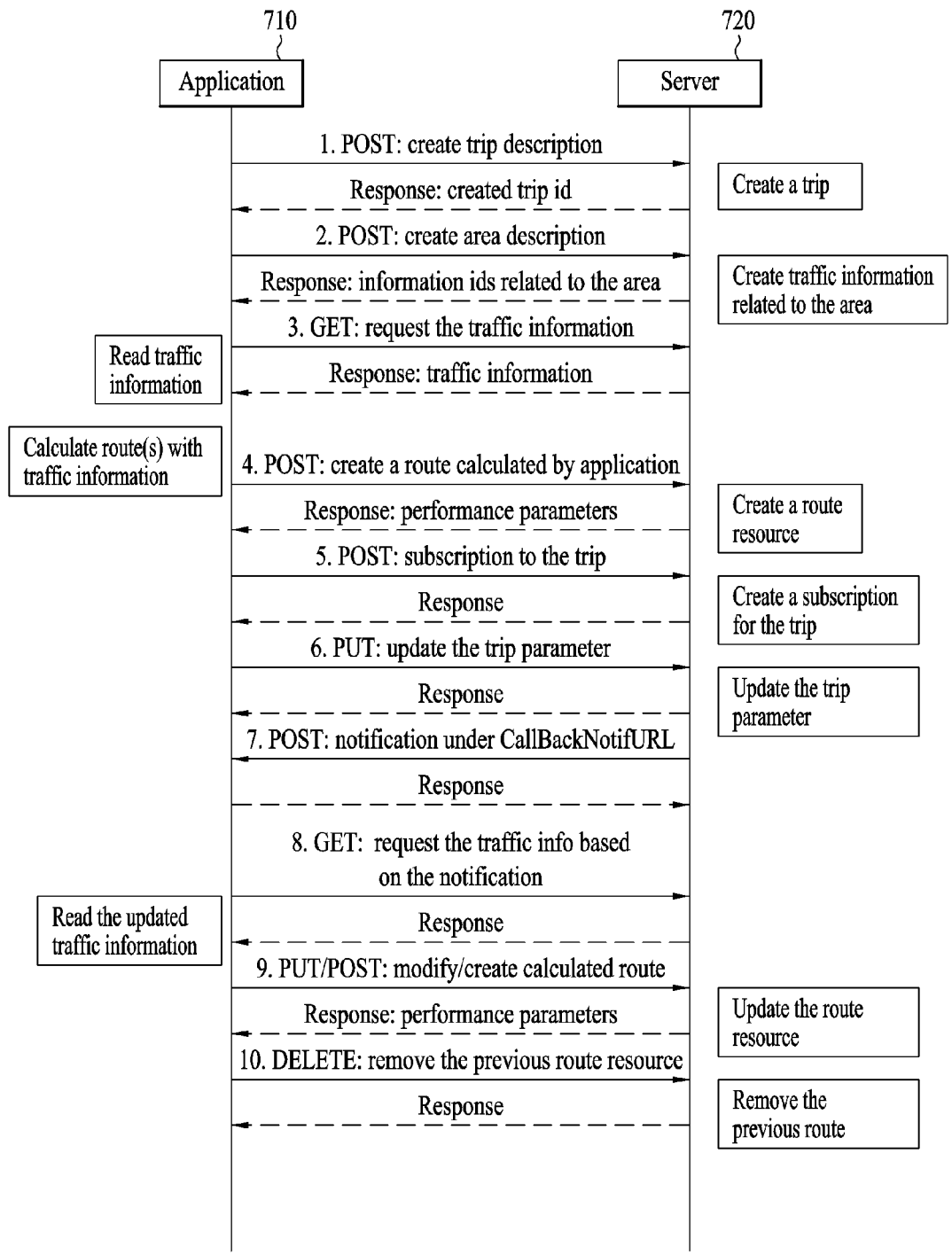
FIG. 7 is a diagram showing an example of the embodiment related to FIG. 6.

FIG. 7 is a diagram showing detailed operation according to one embodiment of the present invention shown in FIG.

6. An application 710 corresponds to a DynNav application as described above and may be referred to as a "terminal". Accordingly, in the description of FIG. 7, the application is referred to as the "terminal". In addition, a server 720 corresponds to a DynNav server as described above.

1. POST: Create Trip Description

The terminal 710 may create a trip description via trip parameters defined by a user of the terminal, that is, an origin, a destination or other information, using a POST command. In response thereto, the server 720 may create a trip corresponding to the trip description and transmit an identifier thereof and defined parameters to the terminal.

2. POST: Create Area Description

The terminal may create an area description using a POST command in order to request traffic information related to the trip identified by the origin and destination of the trip. For bandwidth and operation optimization, the server may provide two types of traffic information as a response.

a) performance parameters in the vicinity of the origin if severe congestion occurs in the vicinity of the origin; that is, in the present specification, the (network) performance parameter means information about performance or traffic flow (that is, speed, delay and travel time) of the segment indicating an area or route, the server transmits performance parameters of an area or on a route within a predetermined radius from the origin as a response in "2. POST: create area description", and these performance parameters may be provided by the server if a congestion having a predetermined level or more occurs in the area or on the route within the predetermined radius.

b) Traffic events of the area related to the trip.

3. GET: Request the Traffic Information

The terminal may read the traffic information provided by the server using a GET command. This traffic information may be used by the terminal to estimate or calculate the route of the above-defined trip while avoiding critical segments of road (influenced by accidents, construction or road congestions).

4. POST: Create a Route Calculated by Application

The terminal may upload the estimated route (selected from the routes calculated by the terminal) to the server using a POST command. The server may reply with a representation of "route" resource including the performance parameters and links to traffic events.

5. POST: Subscription to the Trip

The terminal may subscribe to the notification service for the area selected in step 2 and for the defined trip in step 3 using a POST command. The terminal will be notified of new information about performance parameters and traffic events related to the selected area and to all the routes uploaded for the trip.

6. PUT: Update the Trip Parameter

The terminal may periodically update the current position thereof using a PUT command in order to modify the origin parameter of the trip resource. This operation is triggered when the vehicle having the terminal mounted therein drives a certain distance from the previous reporting position, and the server may utilize this information to delete the already traveled segments from the route(s) information.

If the destination is set to the location of the third party (that is, the location of the target terminal), the server may acquire the current location of the third party and determine whether re-calculation of the route (re-routing) is required by the terminal. A determination is made that re-calculation of the route is required, when any one of the above-described conditions is satisfied: the third party moves from the previously reported location by a certain distance or more; the third party does not move from the previously reported location by a certain distance or more but the distance between the source terminal and the target terminal is closer than a threshold value; or the traffic condition is significantly changed on the route between the source terminal and the target terminal.

7. POST: Notification Under CallBackNotifURL

When traffic events and/or severe congestion along the proposed routes are detected by the server or when the destination is the location of the third party and re-calculation of the route is required, the server notifies the terminal of this information. The server may provide the updated traffic information of the current route and/or the updated location of the third party using a POST command via a link specified by the terminal.

If the destination is the location of the third party, when the location of the third party is changed, the server may provide additional traffic information (e.g., traffic information between the changed location of the third party and the previously reported location of the third party) such that the terminal estimates an alternative route based on the changed location of the third party.

8. GET: Request the Traffic Info Based on the Notification.

The terminal may access the updated traffic information (the traffic events and the performance parameters) related to the route using a GET command.

9. PUT/POST: Modify/Create Calculated Route

The terminal may decide to recalculate a new route under the following conditions.

a) The terminal receives the updated traffic information and/or updated destination in step 8.

b) The terminal detects that the vehicle is deviating and diverting from the defined route.

The terminal may upload the newly calculated route to the server using a PUT command for an existing route or a POST command for a newly registered route, depending on whether or not the terminal wishes to maintain validity of the previous route. The server may reply with a representation of the "route" resource which contains performance parameters.

This step may be repeated several times until the performance of the recalculated route, that is travel time, is better than the previous routes. However, in order to avoid going into a loop, the terminal may define a new area description to acquire traffic information in an area where repetition occurs with operations similar to those described in steps 2 and 3.

For bandwidth optimization, the terminal can choose to use a partial route schema, uploading the changed segments with respect to an already defined reference route.

10. DELETE: Response the Previous Route Resource

The terminal may delete the previous routes no longer in use from the set of proposed routes using a DELETE command. The terminal may delete the newly calculated route from the set of proposed routes if the performance of the new route is worse than that of the previous route. The terminal may unsubscribe from the notification service for the previous routes using a DELETE command (if the new route has replaced the old route using a modify operation in step 9, the delete operation is not needed).

Figure 8:
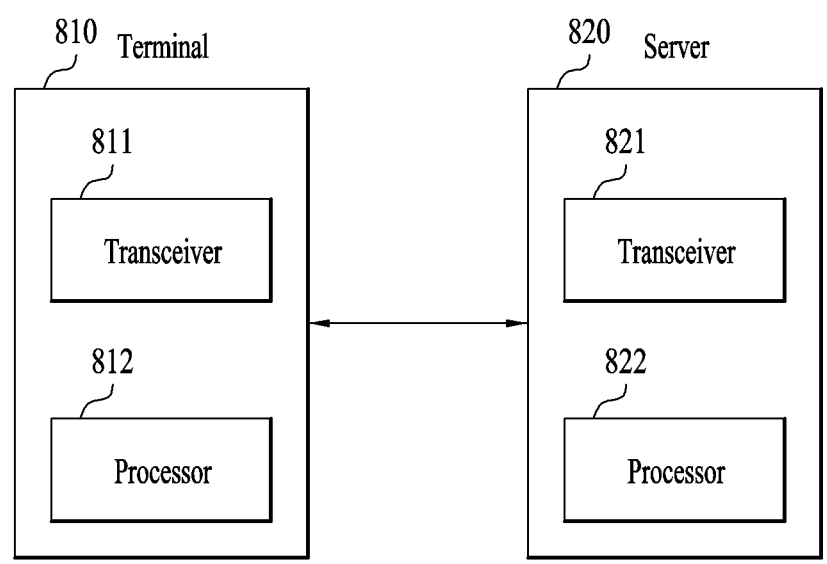
FIG. 8 is a block diagram showing a device in which the embodiments of the present invention may be implemented.

FIG. 8 is a block diagram showing a device in which the embodiments of the present invention may be implemented. The terminal 810 may include a transceiver 811 configured to communicate with the server 820 and a processor 812 configured to calculate the route via the traffic information received from the server. The server 820 may include a transceiver 821 configured to communicate with the terminal and a processor 822 configured to calculate the route based on parameters related to a trip, such as an origin and a destination, which are received from the terminal, or collect and process the traffic information.

In the embodiment of the present invention to be described with reference to FIG. 8, the terminal 810 is a smart ND. In this embodiment, the processor 812 may transmit the current location of the terminal to the server when the terminal moves from the previously reported location by a specific distance. In addition, when the destination is the location of the third party defined by the identifier (ID) of the third party and it is determined that re-calculation of the route is required according to specific conditions based on the current location of the third party, the processor 812 may be configured to receive the current location of the third party and the updated traffic information of the current route from the server. Whether re-calculation of the route is required is determined by the server for managing/providing the traffic information.

It may be determined that re-calculation of the route is required when any one of the specific conditions is satisfied: (1) the third party moves from the previously reported location of the third party by a certain distance or more, or (2) the third party does not move from the previously reported location by a certain distance or more but the distance between the terminal and the third party is less than a threshold value.

The processor 812 may be configured to re-calculate the route based on the received current location of the third party and the updated traffic information of the current route.

Upon determining that re-calculation of the route is not required, the processor 812 may be configured to wait until the terminal moves from the current location of the terminal by the specific distance.

In one embodiment of the present invention, the processor 822 of the server is configured to receive the current location of the terminal from the terminal when the terminal moves from the previously reported location by the specific distance. The processor 822 may be configured to acquire the current location of the third party and to determine whether re-calculation of the route is required according to the specific conditions based on the acquired current location of the third party, when the destination is the location of the third party defined by the ID of the third party.

For specific conditions, refer to the above description of the processor 812.

In addition, upon determining that re-calculation of the route is required, the processor 822 may be configured to transmit the acquired current location of the third party and the updated traffic information of the current route to the terminal.

When the current location of the terminal is received from the terminal, the processor 822 may be configured to request the location information of the third party from the location server and receive the location information of the third party from the location server in correspondence with the request.

Upon determining that re-calculation of the route is not required, the processor 822 may be configured to wait until the terminal moves from the current location of the terminal by the specific distance.

The terminal or the server may perform any one of the above-described embodiments or a combination of two or more of the above-described embodiments.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a navigation device or server.

The invention claimed is:

1. A method of, at a server, determining whether re-calculation of a route for a trip from a terminal to a destination is required using traffic information, the method comprising:
   receiving a current location of the terminal from the terminal when the terminal moves from a previously reported location by a specific distance;
   acquiring a current location of a third party when the destination is a location of the third party defined by an identifier (ID) of the third party; and
   determining whether re-calculation of the route is required according to a condition based on the acquired current location of the third party,
   wherein the condition includes:
   when the third party does not move from the previously reported location more than a predetermined distance or more and a distance between the current location of the terminal and the current location of the third party is less than a threshold value, and
   wherein, if the condition is satisfied, a determination is made that re-calculation of the route is required.

2. The method according to claim 1, further comprising, if the determination is made that re-calculation of the route is required, transmitting the acquired current location of the third party and updated traffic information of an ongoing route to the terminal.

3. The method according to claim 2, wherein the terminal is configured to re-calculate the route based on the acquired current location of the third party and the updated traffic information for the ongoing route.

4. The method according to claim 1, further comprising:
   if the current location of the terminal is received from the terminal,
   requesting location information of the third party to a location server; and
   receiving the location information of the third party from the location server in response to the request.

5. The method according to claim 1, further comprising, if the determination is made that re-calculation of the route is not required, waiting until the terminal moves from the current location of the terminal by the specific distance.

6. A method of, at a terminal, determining whether re-calculation of a route for a trip from the terminal to a destination is required using traffic information, the method comprising:
   transmitting a current location of the terminal to a server when the terminal moves from a previously reported location by a specific distance; and
   receiving a current location of a third party and updated traffic information of an ongoing route from the server, when the destination is a location of the third party defined by an identifier (ID) of the third party and a determination is made by the server that re-calculation of the route is required according to a condition based on the current location of the third party, wherein the condition includes:

when the third party does not move from the previously reported location more than a predetermined distance and a distance between the current location of the terminal and the current location of the third party is less than a threshold value, and wherein, if the condition is satisfied, a determination is made that re-calculation of the route is required.

7. The method according to claim 6, further comprising re-calculating the route based on the received current location of the third party and the updated traffic information of the ongoing route.

8. The method according to claim 6, further comprising waiting until the terminal moves from the current location by the specific location, if the determination is made that re-calculation of the route is not required.

9. A server configured to determine whether re-calculation of a route for a trip from a terminal to a destination is required using traffic information, the server comprising:

a transceiver configured to communicate with the terminal; and a processor configured to provide traffic information of a route received from the terminal, wherein the processor is configured to:

receive a current location of the terminal from the terminal when the terminal moves from a previously reported location by a specific distance, acquire a current location of a third party when the destination is a location of the third party defined by an identifier (ID) of the third party, and determine whether re-calculation of the route is required according to a condition based on the acquired current location of the third party, wherein the condition includes:

when the third party does not move from the previously reported location more than a predetermined distance and a distance between the current location of the terminal and the current location of the third party is less than a threshold value, and wherein, if the condition is satisfied, a determination is made that re-calculation of the route is required.

10. The server according to claim 9, wherein, if the determination is made that re-calculation of the route is required, the processor is configured to transmit the acquired current location of the third party and updated traffic information of an ongoing route to the terminal.

11. The server according to claim 10, wherein the terminal is configured to re-calculate the route based on the acquired current location of the third party and the updated traffic information of the ongoing route.

12. The server according to claim 9, wherein, if the current location of the terminal is received from the terminal, the processor is configured to request location information of the third party to a location server and to receive the location information of the third party from the location server in response to the request.

13. The server according to claim 9, wherein, if the determination is made that re-calculation of the route is not required, the processor is configured to wait until the terminal moves from the current location of the terminal by the specific distance.

14. A terminal configured to determine whether re-calculation of a route for a trip from the terminal to a destination is required using traffic information, the terminal comprising:

a transceiver configured to communicate with a server; and a processor configured to calculate a route based on traffic information of a route received from the server and/or a location of a destination, wherein the processor is configured to:

transmit a current location of the terminal to the server when the terminal moves from a previously reported location by a specific distance, and receive a current location of a third party and updated traffic information of an ongoing route from the server, when the destination is a location of the third party defined by an identifier (ID) of the third party and a determination is made by the server that re-calculation of the route is required according to a condition based on an ongoing location of the third party, wherein the condition includes:

when the third party does not move from the previously reported location more than a predetermined distance and a distance between the current location of the terminal and the current location of the third party is less than a threshold value, and wherein, if the condition is satisfied, a determination is made that re-calculation of the route is required.

15. The terminal according to claim 14, wherein the processor is configured to re-calculate the route based on the received current location of the third party and the updated traffic information of the ongoing route.

16. The terminal according to claim 14, wherein the processor is configured to wait until the terminal moves from the current location by the specific location, if the determination is made that re-calculation of the route is not required.

* * * * *